March 11, 1952     J. L. DRAKE     2,589,064
MULTIPLE SHEET GLAZING UNITS
Filed Feb. 26, 1946

Inventor
JOHN L. DRAKE.
By
Frank Fraser
Attorney

Patented Mar. 11, 1952

2,589,064

UNITED STATES PATENT OFFICE 2,589,064

MULTIPLE SHEET GLAZING UNITS

John L. Drake, Toledo, Ohio, assignor to Libbey-Owens-Ford Glass Company, Toledo, Ohio, a corporation of Ohio Application February 26, 1946, Serial No. 650,326

2 Claims. (Cl. 20—56.5)

The present invention relates to multiple sheet glazing structures, and more particularly to an improved type of hermetically sealed, all glass and metal, glazing unit.

Briefly stated, the unit of the invention consists of two or more sheets of glass, or other transparent material, maintained in spaced face to face relationship by metallic separator means soldered to the glass sheets through the intermediary of metallic coatings, which coatings are bonded directly to the surface of the glass around the marginal portions of the sheets.

It has already been proposed to make glazing units of this same general character, but the novel features of this invention reside in a special type of glass-to-metal seal. The new seal involves a particular form of separator means, a special way of positioning the metallic coatings around the margins of the sheets, and a special solder joint between the separator and the coatings.

An important object of the invention is the provision of a multiple glass sheet glazing unit with an unusually stable and durable glass-to-metal seal that is highly resistant to the passage of air, moisture and foreign materials therethrough, and to strains arising from variations in pressure differentials between the inside and outside of the unit.

Another object is to provide, in a unit of the above character, a novel kind of glass-to-metal seal in which neither the metallic coatings nor the solder joint will be placed under disruptive tension in normal use.

Another object is the provision in such a glazing unit of a glass-to-metal seal in which strains resulting from greater pressure on the outside than on the inside of the glazing will be taken by the separator means while, under strain resulting from a preponderance of pressure on the inside of the unit, the solder joint will be in shear and the metallic coatings in compression.

Still another object is to provide, in a seal of this kind, a compressible separator strip for absorbing the strains that result from an excessive outside pressure.

Other objects and advantages of the invention will become more apparent during the course of the following description, when taken in connection with the accompanying drawings.

In the drawings, wherein like numerals are employed to designate like parts throughout the same:

Figure 1:
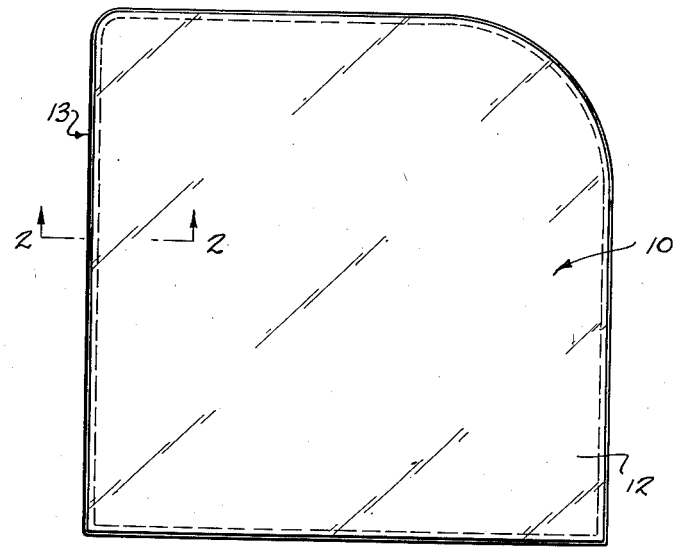
Fig. 1 is a face view of a double glazed unit constructed in accordance with the invention.
Figure 2:
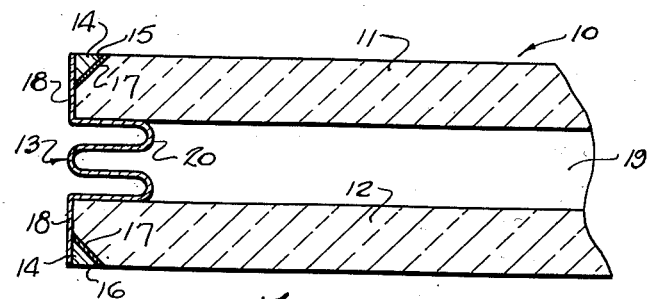
Fig. 2 is a section taken substantially on the line 2—2 in Fig. 1.

Referring now more particularly to the drawings, the double glazed unit shown in Figs. 1 and 2, and designated in its entirety by the numeral 10, is a preferred embodiment of the invention. It is made up of two sheets of glass 11 and 12, secured together in spaced, face to face relationship by a metal separator strip 13, which is soldered as at 14 to metallic coatings 15 and 16 on the glass sheets.

In producing this particular unit, two sheets of glass of the proper size and shape are first beveled on all four sides in the manner indicated at 17. These bevels are thoroughly cleaned and then metallized to provide metallic coatings 15 and 16 that are bonded directly to the glass and are tightly adherent thereto. Any metal that will give a coating or film of the desired thickness and tenacity may be used, and can be applied in any suitable manner. Usually I prefer copper, or copper alloyed with titanium and chromium, sprayed onto the glass with a metallizing gun, as described in the patent to Haven et al., No. 2,235,681, dated March 18, 1941.

When the spray type of metallizing procedure is used it is desirable to polish the bevels 17 after they have been ground because a sprayed metal coating will adhere much better to a ground and polished glass surface than it will to one which has only been ground and has not been polished.

Following their application to the beveled margins of the glass sheets, the metallized coatings 15 and 16 are tinned by coating them with a solder or other equivalent bond-inducing metallic material, preferably applied in the presence of a proper flux. The separator strip 13 is then tinned in the same way along the insides of the flanges 18, adjacent their outer ends. The solder used in these tinning operations, and also for the main part of the solder joint 14, is preferably a low melting point solder with a wide plastic range of melting. By this means I can reduce the temperature of applications, and the plastic range of the solidifying points of the solder makes for easier assembly of the unit.

There are a number of soft solders on the market which can be used satisfactorily for this purpose, but it is also desirable to use a solder which has a very low alloy reaction or electrolytic action. One which tests remarkably well from this standpoint consists of approximately 33 parts of bismuth, 25 parts of lead, and 42 parts of tin.

As indicated above, a flux is preferably used in the tinning operation to insure a permanently satisfactory union between the solder layer and the metal coating on the glass, and between the solder layer and the flange 18 of the separator strip. Zinc chloride dissolved in water is excellent for this purpose and I prefer as dilute a solution as possible.

The separator strip 13 is made of a metal having sufficient spring to give the necessary resilience, and preferably one having approximately the same coefficient of expansion and contraction as the glass. As shown, the strip 13 is constructed with a looped body portion 20 in a sort of bellows construction, with the lateral flanges 18 extending outwardly from the ends of the looped portion. The separator is adapted to extend completely around the four sides of the unit 10, and may be in one piece, stamped or otherwise formed, or in any number of separate pieces, soldered or otherwise permanently and tightly joined together at their meeting points.

In assembling the unit a glass sheet, properly beveled and metallized is set into the continuous frame formed by the separator strip 13, and the tinned metal coating 15 is then soldered to the tinned upper portion of one of the flanges 18 by a continuous strip of solder 14, triangular in cross section and running entirely around the unit. With one glass sheet thus firmly soldered in place, the separator strip 13 is then turned over and the second glass sheet arranged in place and soldered in the same manner as described for the first sheet, to complete the unit.

Following the construction of the unit, a small hole or holes may be drilled in the separator strip to permit any desired conditions to be set up within the unit. Through such openings air can be withdrawn to give a subatmospheric pressure between the glass sheets; or dehydrated air, or a suitable gas, may be circulated through the air space 19. I prefer to use dehydrated air at normal atmospheric pressures within the unit. In any event, however, as soon as the desired conditions have been created, the openings are soldered shut and the unit is then hermetically sealed to the outside atmosphere.

With this sort of all glass and metal construction it is possible to obtain a unit that is completely impervious to the passage of moisture or dirt laden air from the outside in. Furthermore, such a unit, when properly constructed, will not break down under the strains normally encountered in insulated multiple sheet glazings.

Perhaps the greatest force tending to cause leaks in hermetically sealed units of this character is the variation in pressure differential between the inside and the outside thereof. For example, when a unit is sealed at normal atmospheric pressures there is a substantially equal pressure of air on the outside and on the inside. However, when such a unit is shipped through higher or lower altitudes; or, in use, is subjected to sudden changes of temperature or of atmospheric pressures, as in aircraft, or even in railroad cars; there will be a corresponding differential in pressure between the inside and the outside, and these pressure differentials may fluctuate more or less continuously during the life of the unit.

One of the most serious disruptive forces that known glass-to-metal seals, which involve a metallized coating on the glass, have to withstand is that of tensional strain on the metallic coatings and solder joints. According to the present invention, however, the metallized coating on the glass and the solder joint are never placed in tension by any pressure differential that can arise between the inside and the outside of the unit.

To illustrate, when the pressure is greater on the outside of the unit of Figs. 1 and 2, due to lower than sealing altitudes or greater outside temperature: there will be no strain on the seal at all, because the thrust of the glass sheets will be taken upon the parallel sides of the body portion 20 of the separator 13, and absorbed by the bellows action thereof.

On the other hand, when the greater pressure is on the inside of the unit, tending to force the glass sheets away from the separator and out of the frame formed thereby, there will still be no tension on either the metallic coatings or the solder joint. Instead, under this type of strain, the metallic coatings will be in compression and the solder joints will be in shear. Consequently, there is no tendency at any time to lift the metallized coatings from the glass.

Figure 3:
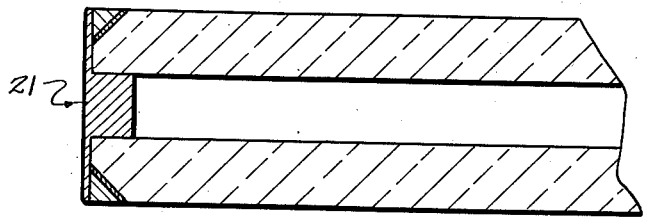
Fig. 3 is a view similar to Fig. 2, showing a modified form of separator strip.

The modified form of unit shown in Fig. 3 is similar in construction and operation to the form shown in Figs. 1 and 2, the principal difference being in the fact that the separator strip 21 in the last figure is not compressible. Instead, this separator is relatively rigid and may be lead, aluminum extrusion, brass or the like. If lead is used, I prefer an alloy containing approximately 3% of antimony. This gives a slightly stiffer strip and one which has a higher melting point than pure lead.

The assembly procedure for the Fig. 3 unit may be exactly the same as that outlined for the Fig. 2 structure, and the manner in which this modified unit resists disruptive strains is also the same.

Obviously the invention is adaptable to units involving three or more glass sheets, as well as to the double glazed structures shown; and, in addition to the alternate possibilities specifically described and suggested, it will be understood that various other changes in the shape, size and arrangement of parts may be resorted to without departing from the spirit of the invention or the scope of the subjoined claims.

I claim:

1. A multiple sheet glazing unit comprising a plurality of glass sheets arranged in spaced face to face relationship, the outside sheets of said unit being provided with continuous outside bevels therearound, metallic coatings on said bevels, separator means having flanges extending around the edges of said glass sheets and a portion thereof lying between said sheets and continuous strips of solder triangular in cross section securing the flanges of said separator means to said metallic coatings.

2. A multiple sheet glazing unit comprising a plurality of glass sheets arranged in spaced face to face relationship, the outer edges of the outside sheets being provided with continuous bevels, metallic coatings on said bevels, separator means having a portion thereof lying between the glass sheets and having flanges extending around the edges of the glass sheets and overlying the beveled edges of said sheets to form therewith substantially triangular grooves, and continuous strips of solder triangular in cross section received within said grooves securing the flanges of the separator means to the metallic coatings, the outer edges of the flanges and the strips of solder being flush with the outer surfaces of the glass sheets.

JOHN L. DRAKE.

REFERENCES CITED

The following references are of record in the file of this patent:

UNITED STATES PATENTS

| Number | Name | Date |
| --- | --- | --- |
| 1,988,964 | Barrows | Jan. 22, 1935 |
| 2,097,073 | Long | Oct. 26, 1937 |
| 2,122,453 | Clause | July 5, 1938 |
| 2,235,680 | Haven, et al. | Mar. 18, 1941 |
| 2,335,376 | Ballintine, et al. | Nov. 30, 1943 |